3,751,503
PRODUCTION OF BENZENE
Roy John Sampson, Christopher Buxton Spencer, and John Garfield Chenoweth, all of Norton Hall, The Green, Norton, Stockton-on-Tees, Teesside, England
No Drawing. Filed Mar. 9, 1972, Ser. No. 233,773
Claims priority, application Great Britain, Mar. 26, 1971, 7,912/71
Int. Cl. C07c 3/58
U.S. Cl. 260—672 R     11 Claims

ABSTRACT OF THE DISCLOSURE

Alkyl aromatic hydrocarbons, for example toluene, are dealkylated to yield benzene and hydrogen in the presence of steam, and optionally, hydrogen over a Group VIII noble metal catalyst supported on alpha-alumina. The products of the reaction are phase separated to yield an organic fraction from which benzene is separated, the remainder of the fraction comprising unchanged and/or other aromatic hydrocarbons being recycled as feed material for continued dealkylation. The process may be used to increase the aromatics content and to increase the ratio of lower to higher aromatic in paraffin-aromatics mixtures, for example the hydrocarbon mixture obtained by reforming.

---

This invention relates to the conversion of alkyl benzenes to benzene and hydrogen.

In our co-pending application Ser. No. 104,162 we have described a continuous process for dealkylating alkyl benzenes such as toluene and $C_9$ aromatic hydrocarbons consisting in passing one or more alkyl benzenes, together with steam preferably in substantial molar excess, in the vapour phase over a solid dealkylation catalyst that contains an active metal component consisting of at least one supported Group VIII noble metal and a support component consisting essentially of alumina, effecting a phase separation upon the reaction products whereby to isolate an organic fraction containing benzene and unchanged and/or other aromatic hydrocarbons, separating benzene from the organic fraction and recycling such unchanged and/or other aromatic hydrocarbons as feed material for continued dealkylation.

We have now found that an especially useful support for the Group VIII noble metal catalyst used in the invention described in our co-pending application consists essentially of alumina containing at least 50% of alpha-alumina, expressed as a percentage of the total alumina present. Preferably, the alumina consists of at least 90% alpha-alumina.

The support may contain also other forms of alumina or alumina-containing material such as zeolite or a spinel and also silica, but preferably there is at least 70% of alpha-alumina present expressed as a percentage of the total support. The presence of silica is, however, considered undesirable although it may perhaps be readily tolerated in small proportion possibly even up to about 5% by weight of the support. A small proportion of alkaline material may be present in order to reduce the intrinsic acidity of the support. Alkali metal and alkaline earth metal oxides are preferred alkalising materials. The presence of minor proportions of other oxidic species may in practice be unavoidable.

The alpha-alumina support may be prepared by firing gamma-alumina in a furnace at temperatures above 950° C. It is preferred for the surface area to be at least 5 $mg.^2g.^{-1}$, and preferably at least 20 $m.^2g.^{-1}$, and for the pore volume to be at least 0.25 $cm.^3g.^{-1}$.

The Group VIII noble metal is preferably platinum or iridium though palladium, ruthenium and rhodium may also be used. The content of noble metal impregnated on the catalyst is suitably from 0.1 to 1% by weight, for example 0.4 to 0.8% by weight, but contents above and below this range may be used if desired. Catalyst regeneration may be accomplished in known manner using an atmosphere of hydrogen, steam, oxygen or oxygen-containing gas such as air.

Co-products of the dealkylation reaction are mainly hydrogen, carbon dioxide and carbon monoxide. These substances are also formed by a competing reaction which occurs simultaneously and leads to loss of selectivity to benzene, namely, steam reforming of the aromatic hydrocarbons. Control, for example by variation of temperature and/or pressure, should therefore be exercised over the reaction conditions in order to maximise the yield of product benzene. In mixtures in which aliphatic hydrocarbons are present with the aromatic hydrocarbons, the aliphatic hydrocarbons react in preference to benzene. Thus the process may be used to increase the aromatics content and to increase the ratio of lower to higher aromatics in paraffin-aromatic mixtures, for example the hydrocarbon mixture obtained by reforming. The paraffins in the mixture are converted to hydrogen and carbon oxides.

However, although hydrogen is formed during the process of the invention and is thus present over some parts of the catalyst bed during the process, catalyst life will be significantly lengthened if provision is made for hydrogen to be present over the whole bed by continuously feeding hydrogen as well as steam and aromatic hydrocarbons to the process.

It will be appreciated that when the process is being operated without hydrogen being fed there will be some catalyst deactivation. This deactivation will occur especially in the bed close to the feed inlet where the partial pressure of hydrogen formed by the reactions occurring in the process is relatively lower than in other parts of the bed.

By feeding hydrogen with the reactant stream the deactivation, which occurs in the absence of hydrogen may be substantially reduced or eliminated especially in the bed close to the feed inlet. Moreover, not only is the loss of catalyst activity reduced, the process of the present invention also enhances the catalyst activity so far as the rate of dealkylation is concerned.

We prefer that the amount of hydrogen fed to the process should be in the range of 5 to 50 moles percent based on total feed, (that is hydrocarbon+steam), more preferably 5 to 20 moles percent.

The hydrogen may be supplied from an external supply but it is preferred to use a recycle of hydrogen formed in the process of the invention.

The process admits of wide variation in the relative proportions of steam and feed aromatic hydrocarbons. A minimum practical molar ratio of steam to aromatic hydrocarbon is probably around the stoichiometric requirement, but higher molar ratios are both desirable and conveniently arranged. Very satisfactory are molar ratios of from 12:1 to 40:1, for example 15:1 to 35:1.

The dealkylation reaction is endothermic and the reactants are desirably preheated to a temperature at least approaching reaction temperature. The reaction temperatures may very suitably be maintained within the range of from 400° to 800° C. The use of lower or higher temperatures is feasible but the preferred operating range of temperature is 500° to 650° C.

The reaction proceeds at any practical pressure but for reasons of operating convenience it is preferred to use above atmospheric pressure. Good performance may be achieved at pressures only marginally above atmospheric (that is to say, at a minimum pressure necessary to achieve an adequate flow of vapour through the reactor system) and also in operations at higher pressures. Very likely, optimum pressures for commercial production will be found to lie within the range of from 5 to 50 atmospheres gauge, more preferably 25 to 50 atmospheres. The use of such moderate pressures is attended by the advantage that handling and processing of the gaseous products of the reaction is facilitated, additional means for gas compression being unnecessary.

Weight hourly space velocities (W.H.S.V.) for the feed aromatic hydrocarbon(s) and the steam are suitably within the range of 0.2 to 10, preferably 0.2 to 2, and 1 to 30, preferably 1 to 10 respectively.

Carbon dioxide is readily separated from the effluent gas phase by known processes, e.g. processes based upon the formation and decomposition of potassium bicarbonate. If carbon monoxide removal is also desired, this may be achieved in known manner by, say, a water-gas shift process (followed if desired and depending upon the desired hydrogen purity, by a methanation step).

Alternatively carbon dioxide may be converted to carbon monoxide by a reverse-shift reaction resulting in a mixture of carbon monoxide and hydrogen which is useful in other processes, for example the Oxo process.

Phase separation of the condensable portion of the effluent from the dealkylation reaction is likewise readily accomplished in known manner. The topstream of aromatic hydrocarbons withdrawn from the phase separation stage may be split (after appropriate drying) by distillation into a product benzene stream and a recycled alkyl aromatic(s) stream. This distillation may be effected in a column that is separate from distillation facilities forming part of any integrated or adjoining plant for aromatic hydrocarbon production or may be effected by such facilities.

The following example illustrates the process of the invention.

A catalyst support consisting chiefly of alpha-alumina was prepared by heating ICI Atricultural Division's 12–1 gamma-alumina pellets for 17 hours at 1075° C. in a stream of air in a muffle furnace. The resulting support consisted of greater than 90% by weight of alpha-alumina and it had a surface area of 13 $m.^2g.^{-1}$ and a pore volume of 0.34 $cm.^{3-1}$. The support was impregnated with platinum so that it contained 0.6% by weight of platinum.

This platinum on alpha-alumina catalyst was used in a process for the dealkylation of toluene. Toluene at a weight hourly space velocity of 0.87 and steam were fed into a reactor maintained at 640° C. and 460 p.s.i.g. The mole ratio of steam to toluene was 18:1.

Samples of the liquid product and the non-condensable gases were analysed by gas-liquid chromatography. This showed that after falling initially the toluene conversion remained steady at 26% for 200 hours prior to termination of the experiment. The yield of benzene based on toluene converted was 88 mole percent. The distribution of the gaseous compounds produced, by the dealkylation and ring breakdown, was as follows:

| | Percent |
|---|---|
| Hydrogen | 74 |
| Carbon dioxide | 23 |
| Methane | 2 |
| Carbon monoxide | 1 |

We claim:

1. A continuous process for steam dealkylating alkyl benzenes which comprises passing one or more alkyl benzenes, together with steam as the dealkylating agent, in the vapour phase over a solid dealkylation catalyst that contains an active metal component consisting of at least one supported Group VIII noble metal and a support component consisting essentially of alumina containing at least 50% of alpha-alumina expressed as a percentage of the total alumina present, effecting a phase separation upon the reaction products whereby to isolate an organic fraction containing benzene, unreacted alkyl benzenes, other aromatic hydrocarbons formed in the process, or both, separating benzene from the organic fraction and recycling such unreacted alkyl benzenes, other aromatic hydrocarbons formed in the process, or both as feed material for continued dealkylation.

2. A process as claimed in claim 1 in which the alumina contains at least 90% of alpha-alumina.

3. A process as claimed in claim 1 in which the surface area of alpha-alumina-containing support is at least 5 $m.^2g.^{-1}$ and the pore volume is at least 0.25 $cm.^3g.^{-1}$.

4. A process as claimed in claim 1 in which the Group VIII noble metal is platinum, iridinum, palladium, rhodium or ruthenium.

5. A process as claimed in claim 4 in which the content of noble metal impregnated on the catalyst is 0.1 to 1% by weight.

6. A process as claimed in claim 1 in which hydrogen is present in the feed together with the alkyl benzenes to be dealkylated and the steam, said hydrogen being present to prolong the life of the catalyst.

7. A process as claimed in claim 6 in which the amount of hydrogen fed to the process is in the range 5 to 50 moles percent based on total feed (hydrocarbon+steam).

8. A process as claimed in claim 1 in which the molar ratio of steam to aromatic hydrocarbon is in the range 12:1 to 40:1.

9. A process as claimed in claim 1 in which the reaction temperature is in the range 400 to 800° C. and the reaction pressure is in the range 5 to 50 atmospheres gauge.

10. A process as claimed in claim 1 in which aliphatic hydrocarbons are present in the alkyl benzene stream.

11. A process as claimed in claim 1 which comprises passing toluene together with steam and hydrogen in the vapour phase over a solid dealkylation catalyst selected from platinum on alumina and iridium on alumina, the alumina containing at least 90% of alpha-alumina, the molar ratio of steam to toluene lying in the range 12:1 to 40:1 and the amount of hydrogen fed to the process lying in the range 5 to 50 mole percent based on total feed (toluene+steam), effecting a phase separation upon the reaction products whereby to isolate an organic fraction containing benzene and the toluene, separating benzene from the organic fraction and recycling such unchanged toluene as feed material for continued dealkylation.

References Cited

UNITED STATES PATENTS

| 3,151,175 | 9/1964 | Goldsmith | 260—672 R |
| 3,204,007 | 8/1965 | Mukai et al. | 260—672 R |
| 3,291,850 | 12/1966 | Carson | 260—672 R |

CURTIS R. DAVIS, Primary Examiner